United States Patent
Lukes

(10) Patent No.: US 9,201,977 B2
(45) Date of Patent: Dec. 1, 2015

(54) AUTOMATIC FLOWCHART-BASED WEBPAGE GENERATION FOR TROUBLESHOOTING OR TASK COMPLETION WITHOUT MANUAL PROGRAMMING

(71) Applicant: Andrew K. Lukes, Escondito, CA (US)

(72) Inventor: Andrew K. Lukes, Escondito, CA (US)

( * ) Notice: Subject to any disclaimer, the term of this patent is extended or adjusted under 35 U.S.C. 154(b) by 388 days.

(21) Appl. No.: 13/797,638

(22) Filed: Mar. 12, 2013

(65) Prior Publication Data

US 2014/0281879 A1    Sep. 18, 2014

(51) Int. Cl.
    *G06F 17/00*    (2006.01)
    *G06F 17/30*    (2006.01)
    *G06Q 10/00*    (2012.01)

(52) U.S. Cl.
    CPC ............ *G06F 17/3089* (2013.01); *G06Q 10/00* (2013.01)

(58) Field of Classification Search
    CPC  G06F 17/24; G06F 17/30896; G06F 17/3089
    USPC .................................. 715/205, 255
    See application file for complete search history.

(56) References Cited

U.S. PATENT DOCUMENTS

| | | | |
|---|---|---|---|
| 5,754,757 A * | 5/1998 | Shrivastava ........... | G06F 11/182 714/11 |
| 5,845,299 A | 12/1998 | Arora et al. | |
| 5,940,834 A | 8/1999 | Pinard et al. | |
| 6,226,648 B1 | 5/2001 | Appleman et al. | |
| 6,546,397 B1 | 4/2003 | Rempell | |
| 6,701,343 B1 | 3/2004 | Kenyon | |
| 7,092,952 B1 * | 8/2006 | Wilens ................................. | 1/1 |
| 7,194,678 B1 | 3/2007 | Koike et al. | |
| 7,403,948 B2 | 7/2008 | Ghoneimy et al. | |
| 7,536,640 B2 | 5/2009 | Zhang et al. | |
| 7,571,177 B2 | 8/2009 | Damle | |
| 7,594,168 B2 | 9/2009 | Rempell | |
| 7,672,938 B2 | 3/2010 | Hawkins | |
| 7,747,941 B2 | 6/2010 | Campbell et al. | |
| 7,788,212 B2 | 8/2010 | Beckmann et al. | |
| 7,853,886 B2 | 12/2010 | Drucker et al. | |
| 7,885,950 B2 | 2/2011 | Hawkins | |
| 7,908,598 B2 | 3/2011 | Betts et al. | |
| 8,281,310 B2 | 10/2012 | Chan | |
| 8,315,893 B2 | 11/2012 | Yaskin et al. | |
| 8,321,457 B2 | 11/2012 | Tan et al. | |
| 8,326,659 B2 | 12/2012 | Yaskin et al. | |
| 8,335,799 B2 | 12/2012 | Tymoshenko et al. | |

(Continued)

OTHER PUBLICATIONS

Toyoda et al., Extracting Evolution of Web Communities from a Series of Web Archives, ACM 2003, pp. 28-37.*

(Continued)

*Primary Examiner* — Cong-Lac Huynh
(74) *Attorney, Agent, or Firm* — LeonardPatel PC

(57) ABSTRACT

Flowchart-based webpages may be automatically generated for troubleshooting or task completion without manual programming by a website developer. A canvas may be displayed that can be used for placement of a plurality of nodes to be associated with respective webpages. Content to include in the respective webpages for the nodes may be received, and connections between the nodes may be validated based on node type. Each node type may have its own respective connection rules. The webpages may be generated for the respective nodes based on the node content and the validated connections between the nodes when the validation succeeds.

20 Claims, 13 Drawing Sheets

(56) References Cited

U.S. PATENT DOCUMENTS

| | | |
|---|---|---|
| 8,340,991 B2 | 12/2012 | Yaskin et al. |
| 8,340,992 B2 | 12/2012 | Yaskin et al. |
| 8,340,993 B2 | 12/2012 | Yaskin et al. |
| 9,049,258 B2 * | 6/2015 | Prats .................... G06F 17/241 1/1 |
| 2001/0034016 A1 | 10/2001 | Ziv-El et al. |
| 2001/0054049 A1 * | 12/2001 | Maeda et al. ................. 707/517 |
| 2002/0073088 A1 | 6/2002 | Beckmann et al. |
| 2002/0158902 A1 | 10/2002 | Hooker et al. |
| 2003/0020746 A1 * | 1/2003 | Chen et al. .................... 345/741 |
| 2004/0078373 A1 | 4/2004 | Ghoneimy et al. |
| 2004/0093328 A1 | 5/2004 | Damle |
| 2004/0123244 A1 | 6/2004 | Campbell et al. |
| 2004/0148307 A1 | 7/2004 | Rempell |
| 2004/0205556 A1 | 10/2004 | Abramovitch |
| 2005/0005000 A1 | 1/2005 | Yoshimoto |
| 2006/0241988 A1 | 10/2006 | Yaskin et al. |
| 2006/0241992 A1 | 10/2006 | Yaskin et al. |
| 2006/0241993 A1 | 10/2006 | Yaskin et al. |
| 2006/0242004 A1 | 10/2006 | Yaskin et al. |
| 2006/0259351 A1 | 11/2006 | Yaskin et al. |
| 2007/0043837 A1 | 2/2007 | Kruse et al. |
| 2007/0088602 A1 | 4/2007 | Yaskin et al. |
| 2007/0100782 A1 | 5/2007 | Reed et al. |
| 2007/0198924 A1 | 8/2007 | Koike et al. |
| 2007/0299985 A1 | 12/2007 | Craig et al. |
| 2007/0299986 A1 | 12/2007 | Craig et al. |
| 2008/0052668 A1 | 2/2008 | Craig et al. |
| 2008/0209327 A1 | 8/2008 | Drucker et al. |
| 2008/0313260 A1 | 12/2008 | Sweet et al. |
| 2009/0094249 A1 | 4/2009 | Hawkins |
| 2009/0150193 A1 | 6/2009 | Hong et al. |
| 2009/0167553 A1 | 7/2009 | Hong et al. |
| 2009/0222416 A1 | 9/2009 | Tymoshenko et al. |
| 2009/0248608 A1 | 10/2009 | Ravikumar et al. |
| 2009/0276706 A1 | 11/2009 | Lukes |
| 2010/0010885 A1 * | 1/2010 | Hill .................... G06Q 20/102 705/14.15 |
| 2010/0095197 A1 | 4/2010 | Klevenz et al. |
| 2010/0107053 A1 | 4/2010 | Kanzaki |
| 2010/0180220 A1 | 7/2010 | Becerra, Jr. |
| 2010/0257466 A1 | 10/2010 | Wroblewski et al. |
| 2010/0306696 A1 | 12/2010 | Groth et al. |
| 2010/0332967 A1 | 12/2010 | Kraft et al. |
| 2011/0029641 A1 * | 2/2011 | Fainberg et al. .............. 709/219 |
| 2011/0145841 A1 | 6/2011 | Sherwood et al. |
| 2012/0124593 A1 | 5/2012 | Walsh |
| 2012/0151408 A1 | 6/2012 | Groth et al. |
| 2012/0221939 A1 * | 8/2012 | Hill .................... G06Q 20/102 715/234 |
| 2012/0296733 A1 * | 11/2012 | Piros et al. ................. 705/14.39 |
| 2015/0039657 A1 * | 2/2015 | Roth et al. .................... 707/805 |
| 2015/0149323 A1 * | 5/2015 | Wei .................... G06Q 30/0631 |
| 2015/0234838 A1 * | 8/2015 | Gabara ................. G06F 3/0346 715/201 |

OTHER PUBLICATIONS

Mengel et al., The Need for a Hypertext Instructional Design Methodology, IEEE 1996, pp. 375-380.*

Creately Online Flowchart Drawing Application Site, http://creately.com/diagram-type/flowchart (Last Accessed Jan. 29, 2013).

Microsoft Flowchart Template for Excel, http://offce.microsoft.com/en-us/templates/flowchart-simple-layout-TC001018440.aspx (last accessed Jan. 29, 2013).

Microsoft Troubleshooting Flowchart for Visio, http://office.microsoft.com/en-us/templates/troubleshooting-flowchart-TC010186325.aspx (last accessed Jan. 29, 2013).

* cited by examiner

AUTOMATIC FLOWCHART-BASED WEBPAGE GENERATION FOR TROUBLESHOOTING OR TASK COMPLETION WITHOUT MANUAL PROGRAMMING

FIELD

The present invention generally pertains to automatic webpage generation, and more specifically, to automatic flowchart-based webpage generation for troubleshooting or task completion without manual programming by a website developer.

BACKGROUND

Conventional approaches to documentation for troubleshooting a problem or showing how to accomplish a task make it difficult for subject matter experts to accurately capture their methods and thought processes. This leads to generic documentation that may leave end users guessing as to how it applies to their specific situation. Furthermore, the subject matter expert generally has to work with a documentation expert to create the documentation, which may lead to inefficiency and communication problems. Accordingly, an improved way to generate documentation and/or show users how to accomplish a task may be beneficial.

SUMMARY

Certain embodiments of the present invention may be implemented and provide solutions to the problems and needs in the art that have not yet been fully solved by conventional webpage generation systems. For example, certain embodiments of the present invention are directed to a software tool that facilitates the creation of webpages by designers, such as subject matter experts, that include flowcharts for troubleshooting a problem or explaining how to accomplish a task.

In one embodiment of the present invention, a computer program is embodied on a computer-readable storage medium. The computer program is configured to cause at least one processor to display, on a display device, a canvas and a plurality of selectable nodes that a designer can select and place in desired positions on the canvas. Each node is associated with a respective webpage. The computer program is also configured to cause the at least one processor to display, on the display device, a node design screen allowing the designer to add content to the respective webpage associated with the node when the designer chooses to edit a node. The node design screen is customized for a type of the node selected by the designer. The computer program is further configured to cause the at least one processor to receive content to include in the respective webpage for each node and connections between the nodes from the designer, and validate the connections between the nodes based on the node type. Each node type has its own respective connection rules. Additionally, the computer program is configured to cause the at least one processor to generate the webpages for the respective nodes based on the node content and the connections between the nodes when the validation succeeds. The nodes and connections collectively form a flowchart on the canvas. Manual programming by the designer is not required to design the flowchart and generate the webpages.

In another embodiment of the present invention, a computer-implemented method includes displaying, by a computing system, a canvas and a plurality of nodes. Each node is associated with a respective webpage. The computer-implemented method also includes displaying, by the computing system, a node design screen allowing the designer to add content to the respective webpage associated with the node. The node design screen is customized for a type of the node selected by the designer. The computer-implemented method further includes receiving, by the computing system, content to include in the respective webpage for each node from the designer, and automatically generating, by the computing system, connections between the nodes based on the types of the nodes and the content received from the designer. Additionally, the computer-implemented method includes validating, by the computing system, the connections between the nodes based on the types of the nodes. Each node type having its own respective connection rules. The computer-implemented method also includes generating, by the computing system, the webpages for the respective nodes based on the node content and the connections between the nodes when the validation succeeds.

In yet another embodiment of the present invention, an apparatus includes a display device, physical memory including computer program instructions, and at least one processor configured to execute the computer program instructions. The at least one processor is configured to display, on the display device, a canvas that can be used for placement of a plurality of nodes to be associated with respective webpages. The at least one processor is also configured to receive content to include in the respective webpages for the nodes and validate connections between the nodes based on node type. Each node type has its own respective connection rules. The at least one processor is further configured to generate the webpages for the respective nodes based on the node content and the validated connections between the nodes when the validation succeeds.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
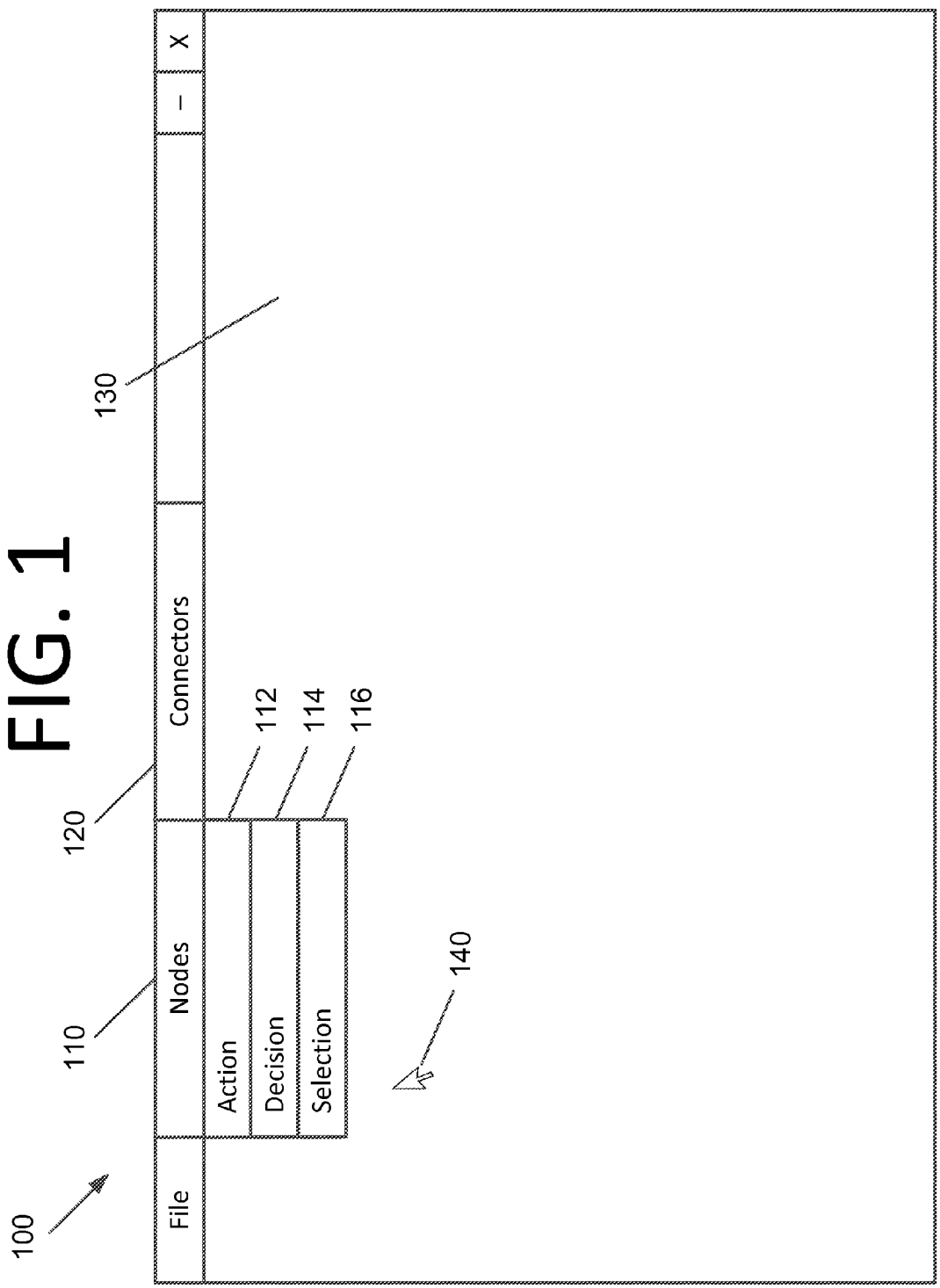
FIG. 1 is a screenshot of a graphical user interface ("GUI"), according to an embodiment of the present invention.

Some embodiments of the present invention are directed to a software tool (i.e., application, computer program, etc.) that facilitates the creation of webpages by designers (e.g., subject matter experts) that include flowcharts for troubleshooting a problem or explain how to accomplish a task. These webpages are made available to end users of the webpages (hereinafter "users"). The software does not require programming knowledge on the part of the users since the webpages are generated automatically.

In some embodiments, the flowcharts include nodes such as start, end, action, decision, and selection, but any desired node types may be included or be custom designed by a designer. During the flowchart creation process, when the designer clicks a given node, an input form is displayed that enables the designer to enter text, pictures, videos, etc. that he or she wants to include in the node. If the node is an action node, a field may be included for what action the user should perform. On the other hand, a decision node may have a field for a user decision, such as yes/no, true/false, etc. A selection node may have fields for items for a user to select. Output links may be included that lead to a next node based on the designer's input for the current node.

Once the designer completes the flowchart by creating all of the desired nodes and linking the nodes with connectors, the flowchart may be verified to check that nodes are properly connected and links are properly labeled. After verification, a series of webpages may be automatically built that correspond to each of the nodes. These webpages may link to one another as designated by the flowchart, and the logic and flow of the webpages may mirror that of the flowchart.

Some embodiments have significant advantages over conventional solutions. For example, most webpage generation tools require someone skilled in webpage design, and takes substantial time. The additional cost for a skilled web designer would not be needed. Communication problems may also be avoided since a subject matter expert may create the content. Furthermore, changes can be made rapidly. Conventional webpage generation tools typically lack an easy way to control which webpages an end user sees and in what order the end user views them. This lack of control may make it difficult for the designer to simply and accurately convey troubleshooting and task completion, for example. With conventional websites, the end user would generally have a hard time knowing which page to go to next. Some embodiments force the end user on the path chosen by the designer, so there is no confusion.

Many companies could benefit from improved customer self-help with respect to performing a task or troubleshooting a problem. For example, a website showing how to assemble furniture or a bicycle could be made clear and could be highly customized. Troubleshooting flowcharts presented on webpages with text, pictures, and/or video, for instance, may make it easier to help customers resolve problems. Subject matter experts could build the websites themselves, which may improve quality. Further, because the decision and selection nodes allow the customer to select what he or she will see next, the customer would only see relevant information. When a customer can engage in self-help, he or she tends to feel more in control and also feel better about the company's products. Additionally, help desk costs can be significantly reduced.

FIG. 1 is a screenshot of a graphical user interface ("GUI") 100, according to an embodiment of the present invention. In some embodiments, GUI 100 may be displayed, for example, on display 1325 by computing system 1300. GUI 100 includes a node selection dropdown menu 110 and a connector selection dropdown menu 120. Connectors form connections between nodes. However, in some embodiments, connectors may be formed automatically based on the node type and/or designer input from the node design screen. Furthermore, any suitable mechanism may be used to select the nodes and connectors, as would be understood by one of ordinary skill in the art. Also, any other menu options may be included as a matter of design choice.

The node types in node selection dropdown menu 110 include action 112, decision, 114, and selection 116, although other node types may be provided depending on the implementation. When a designer selects a node type or a connector type with mouse pointer 140, the selected component is displayed on canvas 130. In some embodiments, once on canvas 130, the designer may move components around on the canvas using the mouse, and when proximate to one another, components may automatically perform actions such as automatically connecting a connector to a node when an end of the connector and the node are proximate to one another. In this manner, the designer can add the desired components to the canvas and make the desired connections. A start node may automatically be created when a designer creates a new flowchart project in some embodiments.

Figure 2:
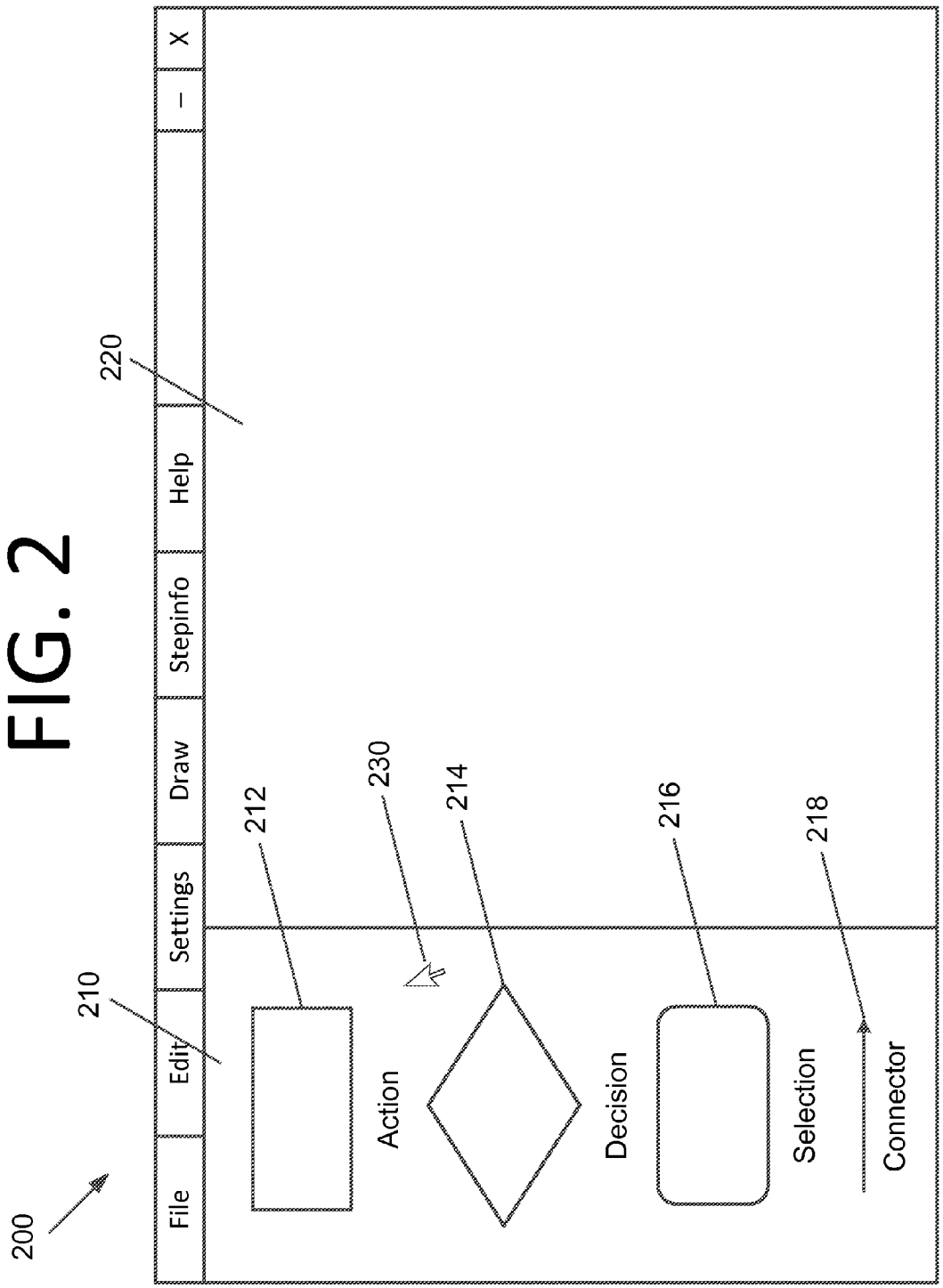
FIG. 2 is a screenshot of another GUI, according to an embodiment of the present invention.

FIG. 2 is a screenshot of another GUI 200, according to an embodiment of the present invention. In some embodiments, GUI 200 may be displayed, for example, on display 1325 by computing system 1300. GUI 200 includes a component selection area 210. Component selection area 210 includes an action node component 212, a decision node component 214, a selection node component 216, and a connector component 218. Other node and/or connector types may be provided depending on the implementation, such as a start node and an end node, for example. Also, any desired menu options may be included as a matter of design choice.

A designer may select a node or a connector with mouse pointer 230 and drag the selected component to canvas 220. In some embodiments, once on canvas 220, the designer may move components around on the canvas using the mouse, and when proximate to one another, components may automatically perform actions such as automatically connecting a connector to a node when an end of the connector and the node are proximate to one another. In this manner, the designer can add the desired components to the canvas and make the desired connections. A start node may automatically be created when a designer creates a new flowchart project in some embodiments.

Figure 3:
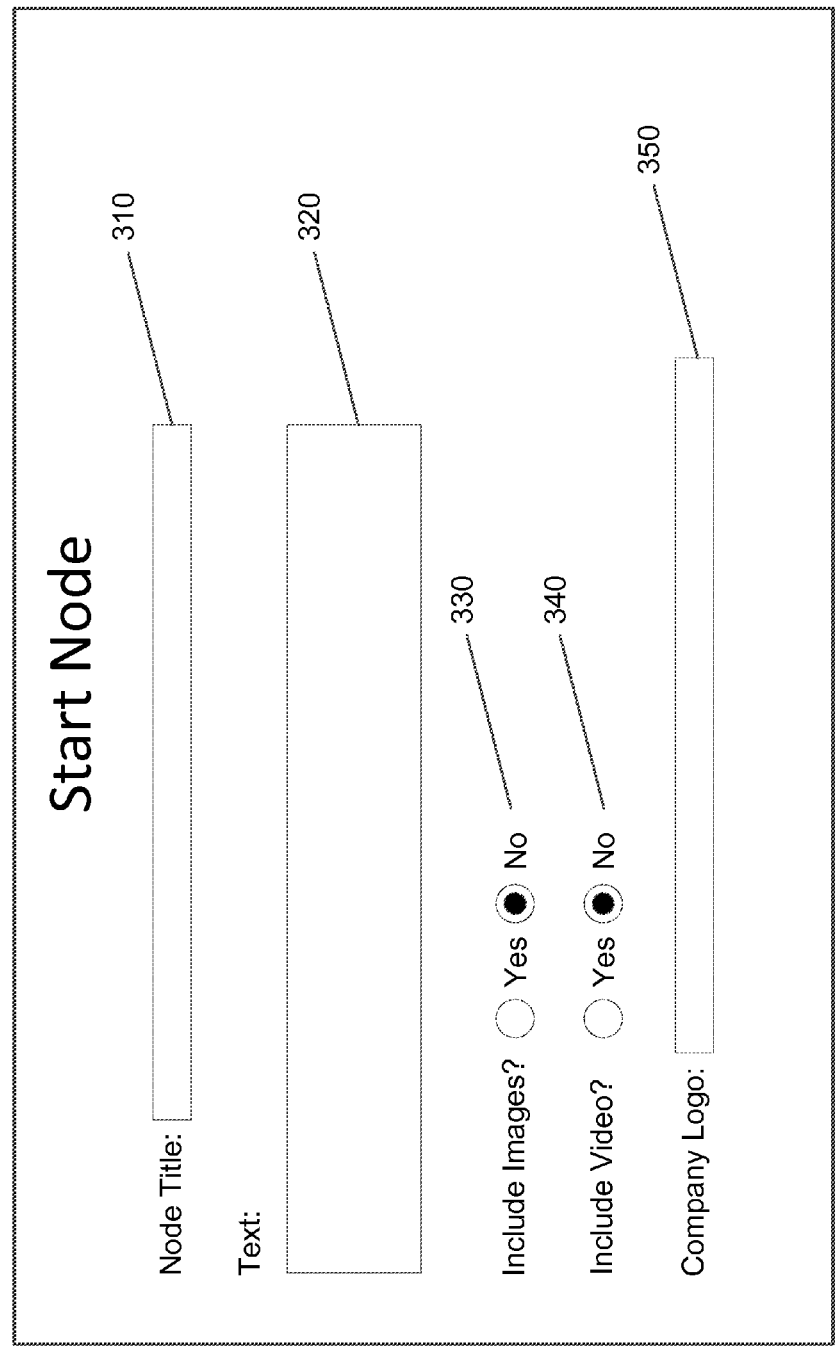
FIG. 3 is a screenshot of a start node design screen, according to an embodiment of the present invention.

FIG. 3 is a screenshot of a start node design screen 300, according to an embodiment of the present invention. In some embodiments, start node design screen 300 may be displayed, for example, on display 1325 by computing system 1300. In some embodiments, there is only one start node, and the start node may have only one output and no inputs, which may be checked during validation. In the alternative, for this node and/or any other nodes, some embodiments may not allow the designer to create unpermitted connections and/or nodes. For instance, if the designer tried to create a second start node, or tried to provide an input for the start node, the designer may be prevented from doing so by the software. The software may also check to make sure that there is only one start node.

Start node design screen 300 includes a text box 310 for a designer to enter a node title and a text box 320 for the designer to enter text associated with the start node. Radio buttons 330 allow the designer to indicate whether images should be included in the start node. Similarly, radio buttons 340 allow the designer to indicate whether video should be included in the start node. While not shown here, the designer may also designate audio to play with the start node in some embodiments. Start node design screen 300 further includes a text box 350 for a designer to enter a link to a company logo. While not shown in this embodiment, input fields for providing company information, contact information, or any other desired information may be included on the screen.

Figure 4:
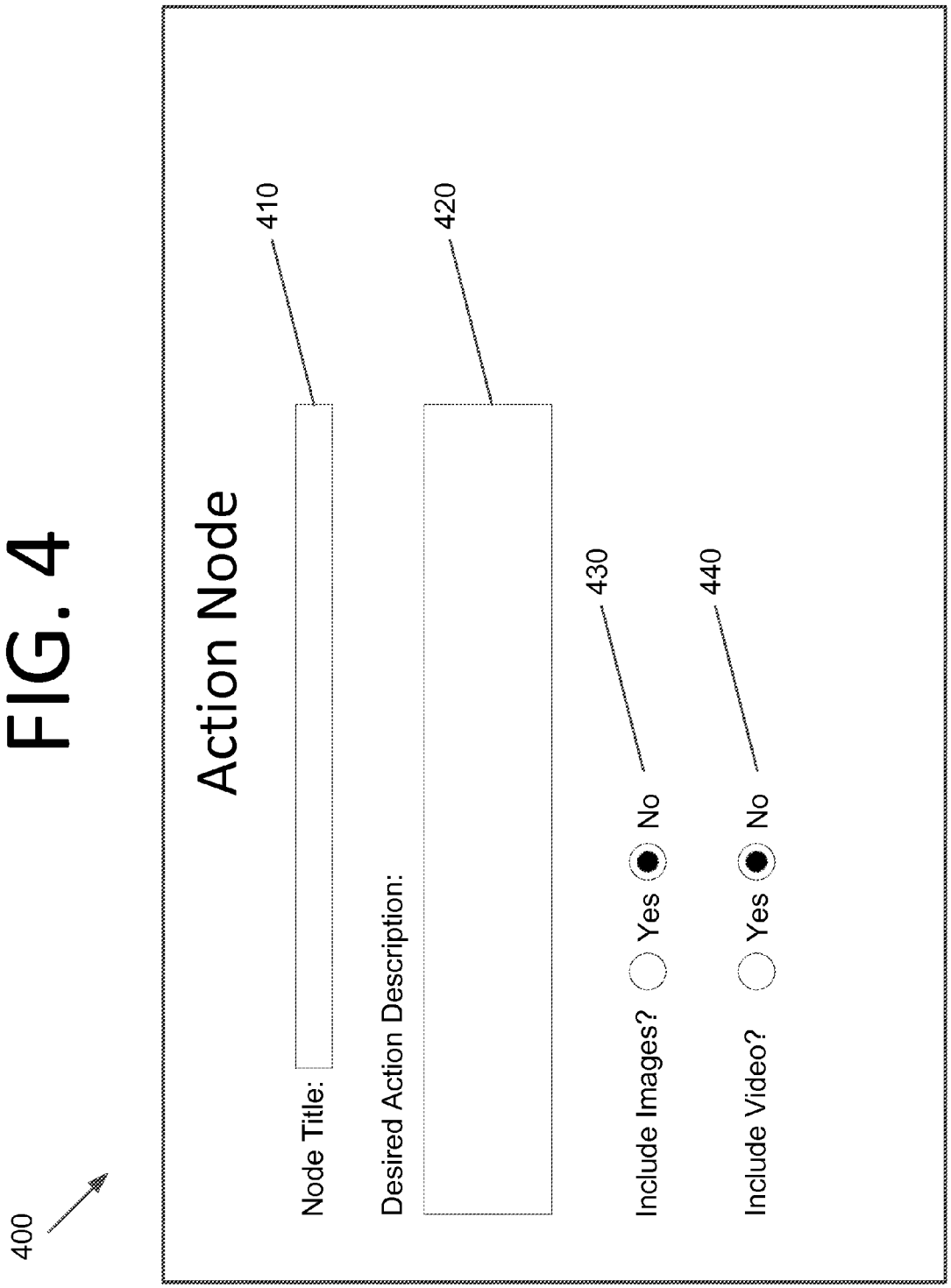
FIG. 4 is a screenshot of an action node design screen, according to an embodiment of the present invention.

FIG. 4 is a screenshot of an action node design screen 400, according to an embodiment of the present invention. In some embodiments, action node design screen 400 may be displayed, for example, on display 1325 by computing system 1300. In some embodiments, an action node has a field for what action a user should perform, along with a title and any desired media. The action node generally must have only one output and at least one input. This may be checked during verification, as discussed in more detail below.

Action node design screen 400 includes a text box 410 for a designer to enter a node title and a text box 420 for a designer to enter a desired action description. Radio buttons 430 allow the designer to indicate whether images should be included in the action node. Similarly, radio buttons 440 allow the designer to indicate whether video should be included in the action node.

If the designer decides to include images, a dropdown box may be shown that enables the designer to select the number of images to display, as well as a button to search a file system for each image or provide a box to input the link manually. Where the designer is allowed to select the image from the file system, the link to the image may be determined automatically in some embodiments. If the designer decides to include video, a button may appear allowing the designer to search a file system for the video or provide a box to input the link manually. Where the designer is allowed to select the image from the file system, the link to the image may be determined automatically in some embodiments. While not shown here, the designer may also designate audio to play with the action node in some embodiments.

Figure 5:
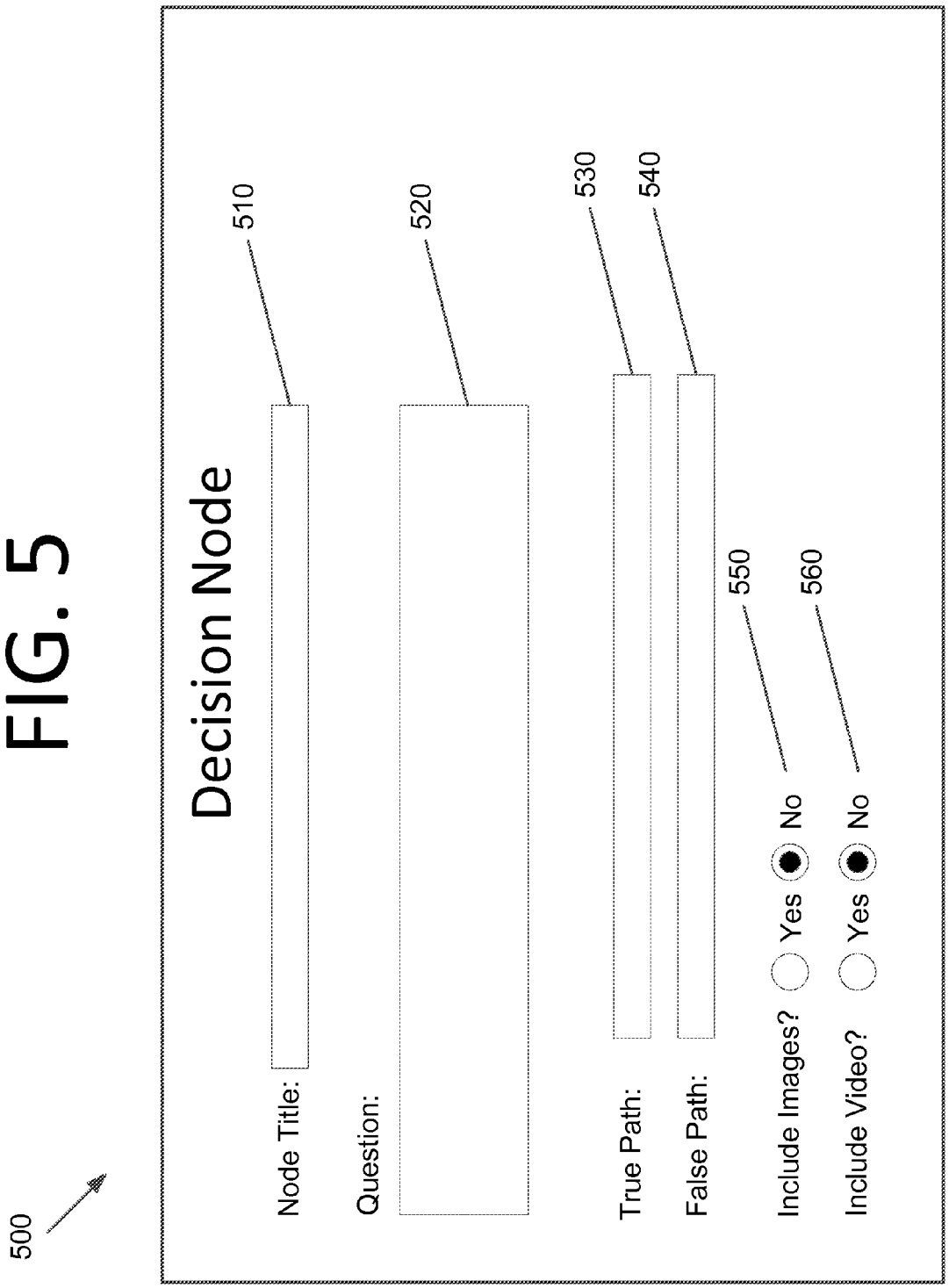
FIG. 5 is a screenshot of a decision node design screen, according to an embodiment of the present invention.

FIG. 5 is a screenshot of a decision node design screen 500, according to an embodiment of the present invention. In some embodiments, decision node design screen 500 may be displayed, for example, on display 1325 by computing system 1300. In some embodiments, a decision node has a field for a question to answer "yes" or "no", or "true" or "false", to, along with a title and any desired media. The decision node generally must have at least one input and a true and false output. This may be checked during verification, as discussed in more detail below. Decision node design screen 500 includes a text box 510 for a designer to enter a node title and a text box 520 for the designer to enter a desired question. Text box 530 allows the designer to enter the true path link, and text box 540 allows the designer to enter the false path link.

Radio buttons 550 allow the designer to indicate whether images should be included in the decision node. Similarly, radio buttons 560 allow the designer to indicate whether video should be included in the decision node. If the designer decides to include images, a dropdown box may be shown that enables the designer to select the number of images to display, as well as a button to search a file system for each image or provide a box to input the link manually. Where the designer is allowed to select the image from the file system, the link to the image may be determined automatically in some embodiments. If the designer decides to include video, a button may appear allowing the designer to search a file system for the video or provide a box to input the link manually. Where the designer is allowed to select the image from the file system, the link to the image may be determined automatically in some embodiments. While not shown here, the designer may also designate audio to play with the decision node in some embodiments.

Figure 6:
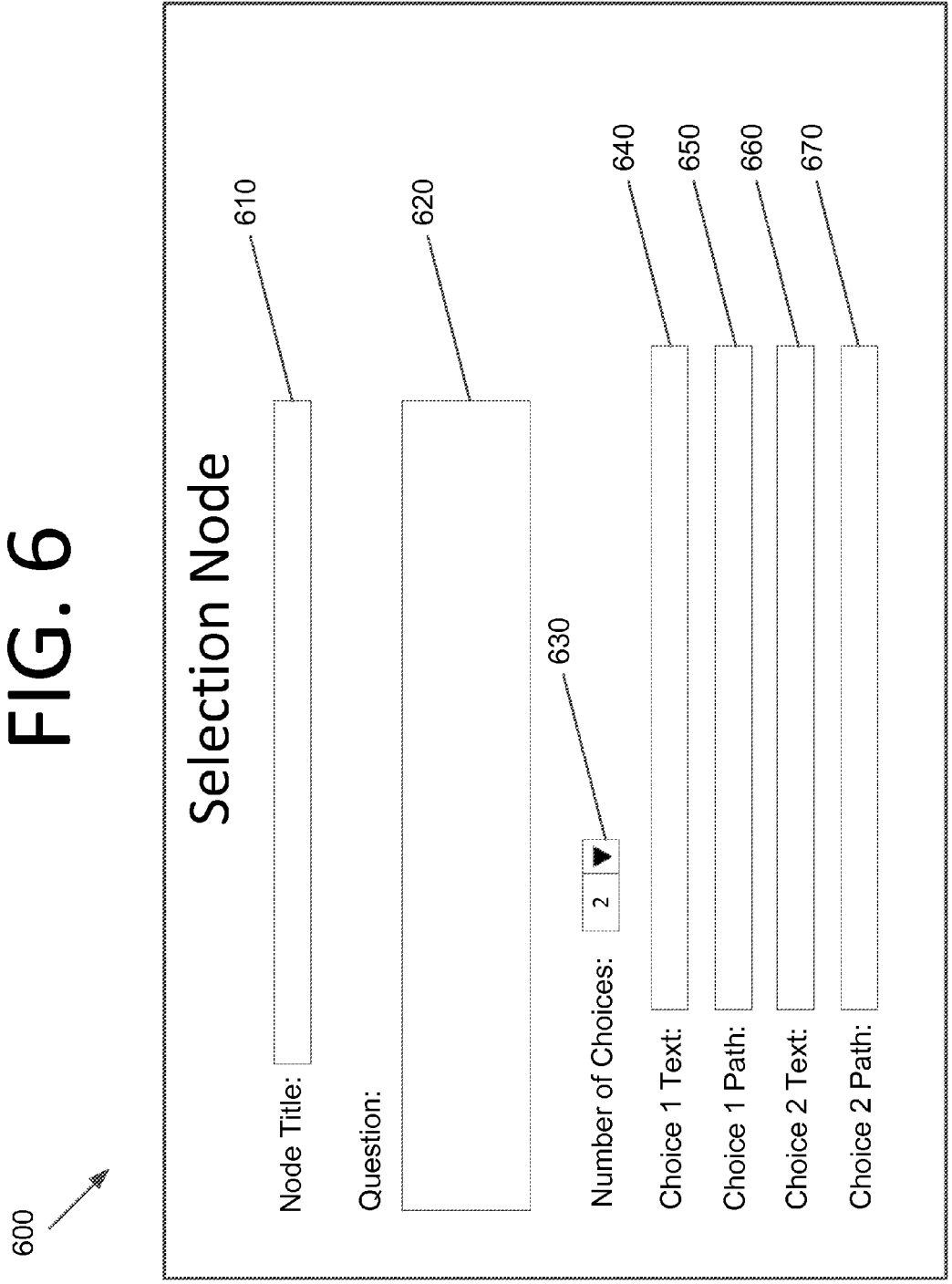
FIG. 6 is a screenshot of a selection node design screen, according to an embodiment of the present invention.

FIG. 6 is a screenshot of a selection node design screen 600, according to an embodiment of the present invention. In some embodiments, selection node design screen 600 may be displayed, for example, on display 1325 by computing system 1300. In some embodiments, a selection node has fields for a user to select between multiple items. The user may read the choices and select the appropriate choice. The user may then be shown the next appropriate webpage based on the choice path. The choice path may be generated automatically based on node connectors. In some embodiments, the selection node has at least one input and one output per selection.

Selection node design screen 600 includes a text box 610 for a designer to enter a node title and a text box 620 for the designer to enter a desired question. The designer may select the number of choices using dropdown menu 630. In some embodiments, dropdown menu 630 may be replaced with a text box or any other suitable mechanism for selecting/entering a desired number of choices.

Upon selecting a number of choices with dropdown menu 630, corresponding text boxes may appear for each choice. For instance, in FIG. 6, the designer has selected two choices using dropdown menu 630. Text boxes 640, 650, 660, and 670 are shown that allow the designer to enter text for choice 1, a link for choice 1, text for choice 2, and a link for choice 2, respectively. However, in some embodiments, any desired number of choices may be provided. While not shown here, the designer may also be able to designate images, audio, and/or video to include with the selection node in some embodiments.

Figure 7:
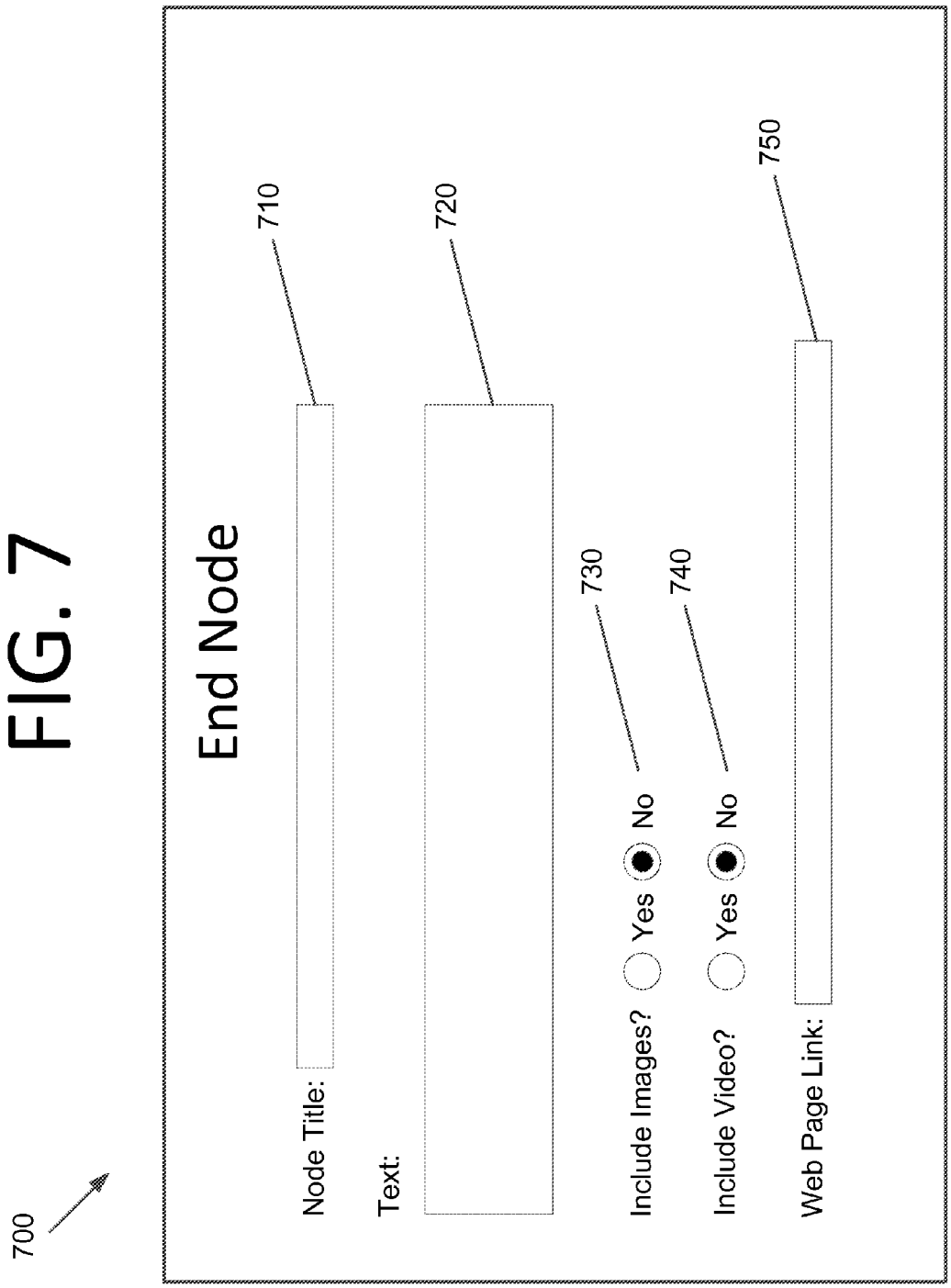
FIG. 7 is a screenshot of an end node design screen, according to an embodiment of the present invention.

FIG. 7 is a screenshot of an end node design screen 700, according to an embodiment of the present invention. In some embodiments, end node design screen 700 may be displayed, for example, on display 1325 by computing system 1300. In some embodiments, there can be only one end node. In certain embodiments, the end node can have at least one input and no outputs. However, in some embodiments, there may be a webpage link that will take a user from the end node webpage to a page associated with a different flowchart, or to a different webpage not found in any flowchart.

End node design screen 700 includes a text box 710 for a designer to enter a node title and a text box 720 for the designer to enter text associated with the end node. Radio buttons 730 allow the designer to indicate whether images should be included in the end node. Similarly, radio buttons 740 allow the designer to indicate whether video should be included in the end node. While not shown here, the designer may also designate audio to play with the end node in some embodiments. End node design screen 700 further includes a text box 750 for the designer to enter a link to another webpage. For instance, a link to a company customer service page could be included to provide a user with further assistance.

Figure 8:
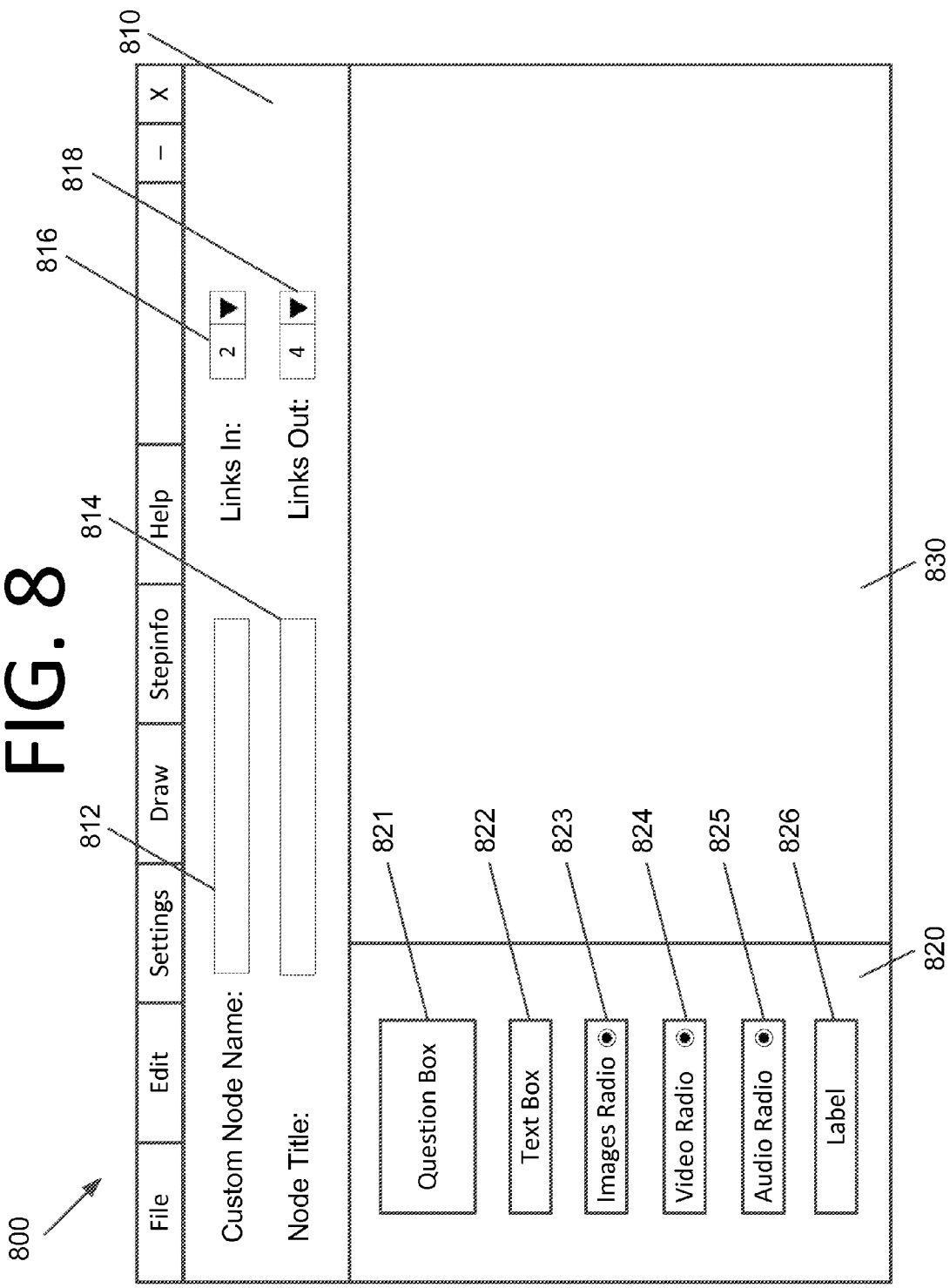
FIG. 8 is a screenshot of a custom node design screen, according to an embodiment of the present invention.

FIG. 8 is a screenshot of a custom node design screen 800, according to an embodiment of the present invention. In some embodiments, custom node design screen 800 may be displayed, for example, on display 1325 by computing system 1300. Custom node design screen 800 includes a node properties section 810 that allows a designer to set various properties for the custom node. The designer may enter a name and title for the custom node in text boxes 812 and 814, respectively. Node properties section 810 also includes dropdown menus 816 and 818 where the designer can specify the number of links in and links out, respectively. In certain embodiments, a unique node shape for the custom node may also be chosen.

Custom node design screen 800 also includes a component selection section 820 that has various components the designer can select and place on canvas 830. Component selection screen 820 includes a question box template 821, a text box template 822, an images radio template 823, a video radio template 824, an audio radio template 825, and a label template 826. However, other components may be included as a matter of design choice, and as would be understood by one of ordinary skill in the art in light of the present disclosure. The components of component selection section 820 may have similar functionality to those discussed with respect to the start, action, decision, selection, and end nodes of FIGS. 3-7 in some embodiments.

It is possible to create any desired custom node in some embodiments. Also, other node types could be included with the software. For example, a designer could create, or the software could include, a fill in the blank node where a user would type in an answer. The fill in the blank node may have a title and optional text and/or media. The software may come up with a list of matching partial or complete words. The software may use regular expressions to compare the words in the match list with the user's input. A match may cause the user to go to one webpage, whereas a mismatch may cause the user to go to another webpage.

Another node type in some embodiments is a multiple choice node. The designer may select the number of possible answers to be displayed, along with which answer(s) must be selected for a correct choice. The correct choice may cause the user to go to one webpage, whereas an incorrect choice may cause the user to go to another webpage.

During the verification process, the match path may be determined along with the no match path in a manner similar to the decision node. The fill in the blank node could be used to create a game where the user is given a clue. If the user guesses correctly, he or she goes to one webpage, and if the user guesses incorrectly, he or she either stays on the current page or goes off on another path.

A game could be created where the user has to move around a city to locate a spot hinted at by a clue. Once there, the user may have to answer a question based on something special about the site, and then go to the next step. A wrong answer could create a longer path to the final destination. The fill in the blank node could also be used for testing or guided learning where if a user knows something, he or she continues on. If not, another path may be taken to go over the material.

The multiple choice node could also be used for testing or guided learning where if a user knows something, he or she continues on. If not, another path may be taken to go over the material.

Figure 9:
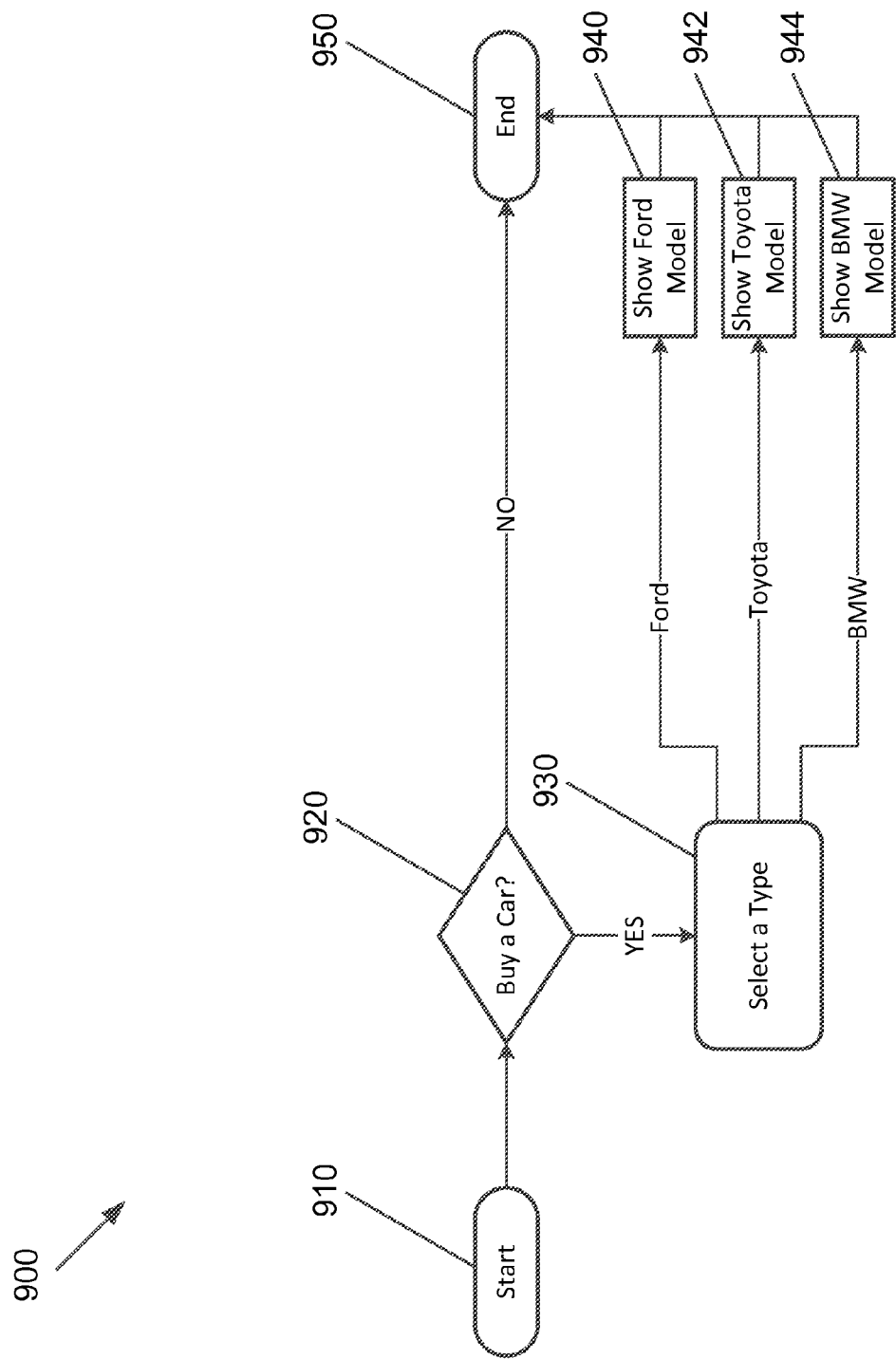
FIG. 9 is an example design of a flowchart for a website, according to an embodiment of the present invention.

FIG. 9 is an example design of a flowchart 900 for a website, according to an embodiment of the present invention. When a designer double clicks or otherwise selects a node, a respective design screen for that node may appear, such as the screens of FIGS. 3-6 and 8 or variants thereof. The process begins with a start node 910. Next, the process flow proceeds to a decision node 920 that ascertains whether the user wants to buy a car. If the user answers no, the process proceeds to an end node 950, which may show websites and contact information for when a user may be ready to consider buying a new car in the future.

If the user answers yes at 920, the process proceeds to selection node 930 where a user can select between a Ford®, a Toyota®, and a BMW®. The user is then taken to respective action nodes 940, 942, 944 that show a model for the selected make of the car. The process then proceeds to end node 950. Naturally, this example is too simplistic for many practical applications, but is provided to give a sense of how nodes may interconnect based on the node rules.

Once the flowchart is completed, the designer may select a verify menu option that performs validation by checking, for example, that the nodes are properly connected and the links are properly labeled. To determine how the webpages will link to one another, each node may be given a unique ID. Each node may be checked for outgoing links, as well as the node that each link is associated with. Once the destination node is determined, the source node may save that information in the appropriate location. For example, an action node may store the information in the next step variable. A decision step may iterate through the two output links, determine what nodes the links (e.g., for true and false or yes and no) are attached to, and save the ID of the node attached to the true, or yes, link in the true variable. The same may occur with the false link. The selection node may use a similar process to identify and save the ID of the node attached to the link for each choice.

Once each node has the information about its outgoing links, the webpages can be built. The text, picture locations, video locations, and next nodes may be placed into a Hypertext Markup Language ("HTML") string that builds the webpage. However, in some embodiments, any suitable markup language or other programming language may be used. In certain embodiments, dynamic technologies such as ASP.NET may be used. The string that creates the header portion of a webpage may have the text variable for the title. Other strings may build the question display, the action display, and the video and/or picture portion of the page. For the start and action nodes, a "next" button may have the unique ID of the next node in the link field. Since each webpage may be saved with the unique ID generated earlier, the link field matches the correct webpage. For the decision node, the yes and no, or true and false, buttons may have respective link fields loaded with the correct unique ID. The same may be true of the select button. In some embodiments, webpages are built on HTML and Cascading Style Sheet ("CSS") templates with the information input by the designer going to predetermined locations on the webpage. The designer may change the look of a page by selecting a different template, but the information input by the designer may be on the page, just in a different layout, color scheme, etc.

The webpages and media may be saved to memory and the start webpage, which may be named index.html, for example, can be displayed in a browser. The start webpage may show the title, text the designer entered, and pictures and/or video, along with a next button. When the next button is pressed, the next webpage may be displayed. The decision webpage may have a yes and no, or true and false, button that will take the user to the proper webpage. The select webpage may have buttons with labels that show the user what button to press to go to the appropriate page.

As an alternative way to save and deliver webpages, some embodiments may employ a database to save step information. A canvas to create a flowchart may be provided, which may be similar to FIGS. 1 and 2 above, for instance. A serialized version of the flowchart may be saved in a project table in a suitable format, such as a binary large object ("BLOB").

A separate table may be used to save step information. When a node is created, the node may be given a unique ID based on the step ID associated with the node. Associated with the step ID may be all information needed to create the webpages, such as the title, text, and media. When the flowchart is verified, the step information may be updated with the step ID(s) based on the requirements of the currently verified step.

Another table may provide the step ID based on a user-friendly URL. The URL could be something like companyname/flowchartname, which may be used to identify the appropriate first step in the steps table. The information contained in the first step record may be used to generate a webpage. After that, the flow through the webpages may be determined by the type of webpage (start, action, decision, select, end, etc.) and what button the user selected. For example, if the webpage was a selection page, and the user chose the "A" selection button on the current webpage, the select node "A" field of the current step record may be used to locate the next step record. The corresponding field may be used for the next step for other possible button selections, such as next, yes, no, B, etc. The newly selected record on the steps table may be used to generate a webpage. The process may repeat until the end webpage is reached. Database design is quite flexible in some embodiments, so there are various ways to design and layout a database to accomplish the desired features of various embodiments.

Figure 10:
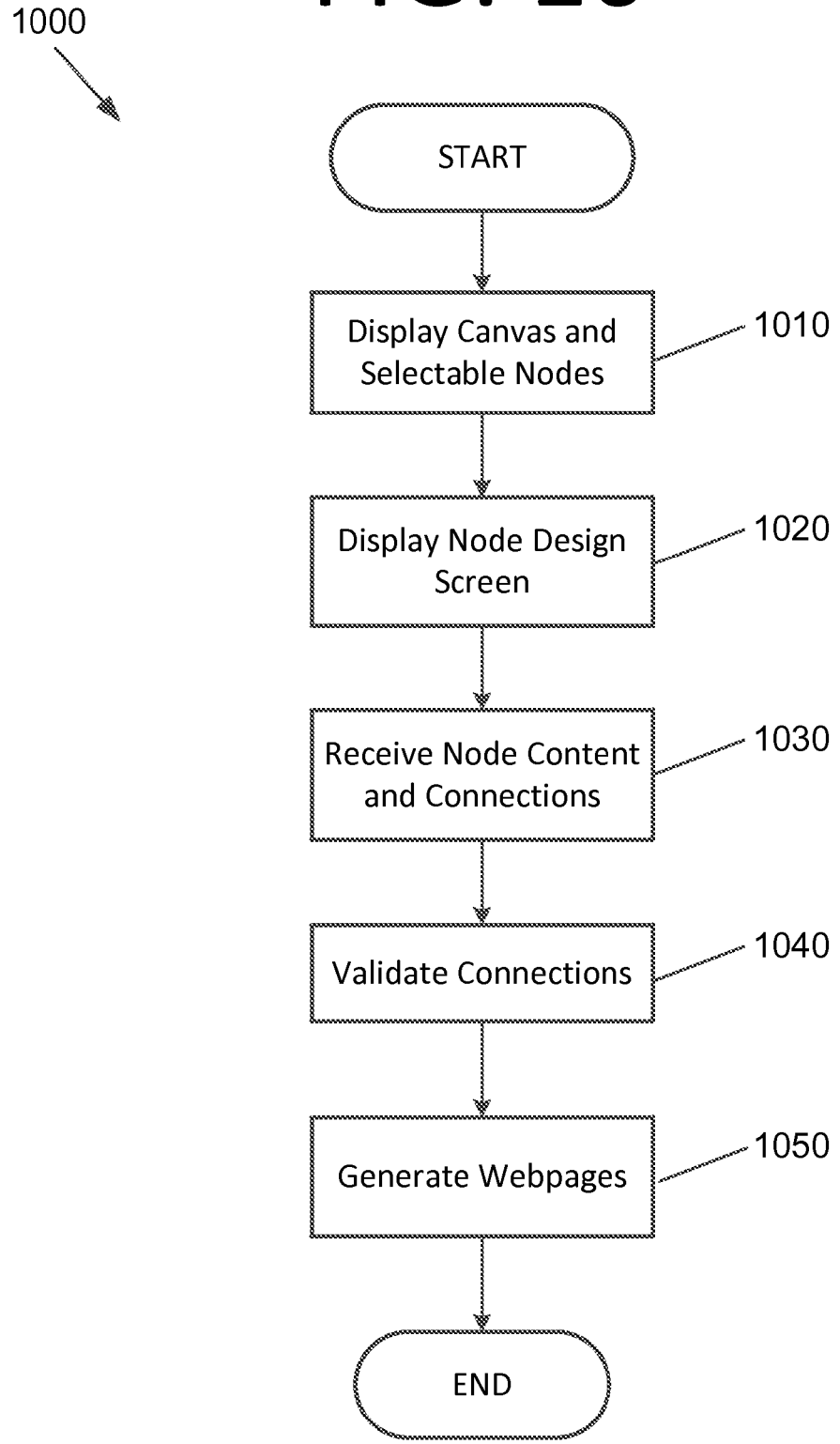
FIG. 10 is a flowchart illustrating a method for designing flowchart-based webpages, according to an embodiment of the present invention.

FIG. 10 is a flowchart 1000 illustrating a method for designing flowchart-based webpages, according to an embodiment of the present invention. In some embodiments, the method may be implemented, for example, by computing system 1300 of FIG. 13. The method begins with displaying a canvas and a plurality of selectable nodes at 1010. A designer may select the nodes and place them in desired positions on the canvas. Each node is associated with a respective webpage that will be generated.

When the designer chooses to edit a node, a node design screen is displayed at 1020, allowing the designer to add content to the respective webpage associated with the node. The node design screen may be customized for the type of the node selected by the designer. Content to include in the respective webpage for each node and connections between the nodes are received from the designer at 1030.

The connections between the nodes are validated based on the node type at 1040. Each node type may have its own respective connection rules. When the validation succeeds, the webpages may be generated for the respective nodes at 1050 based on the node content and the connections between the nodes. The nodes and connections may collectively form a flowchart on the canvas. Manual programming by the designer is generally not required to design the flowchart and generate the webpages.

Figure 11:
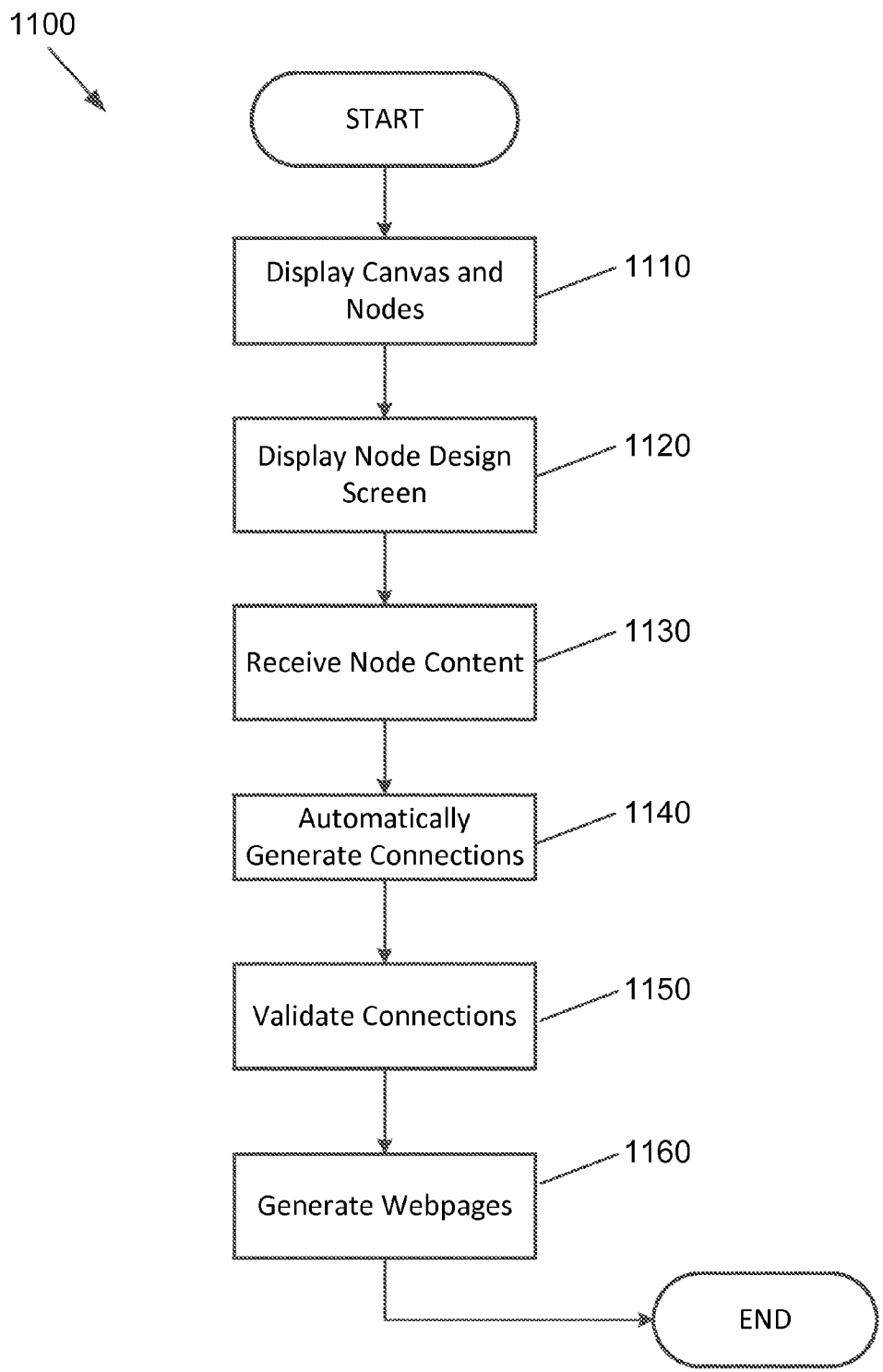
FIG. 11 is a flowchart illustrating another method for designing flowchart-based webpages, according to an embodiment of the present invention.

FIG. 11 is a flowchart 1100 illustrating another method for designing flowchart-based webpages, according to an embodiment of the present invention. In some embodiments, the method may be implemented, for example, by computing system 1300 of FIG. 13. The method begins with displaying a canvas and a plurality of nodes at 1110. Each node may be associated with a respective webpage.

A node design screen is displayed at 1120, allowing the designer to add content to the respective webpage associated with the node. The node design screen may be customized for the type of the node selected by the designer. Content to include in the respective webpage for each node is received from the designer at 1130. The connections between the nodes are automatically generated at 1140 based on the types of the nodes and the content received from the designer.

The connections between the nodes are validated at 1150 based on the types of the nodes. Each node type may have its own respective connection rules. When the validation succeeds, the webpages for the respective nodes are generated at 1160 based on the node content and the connections between the nodes.

Figure 12:
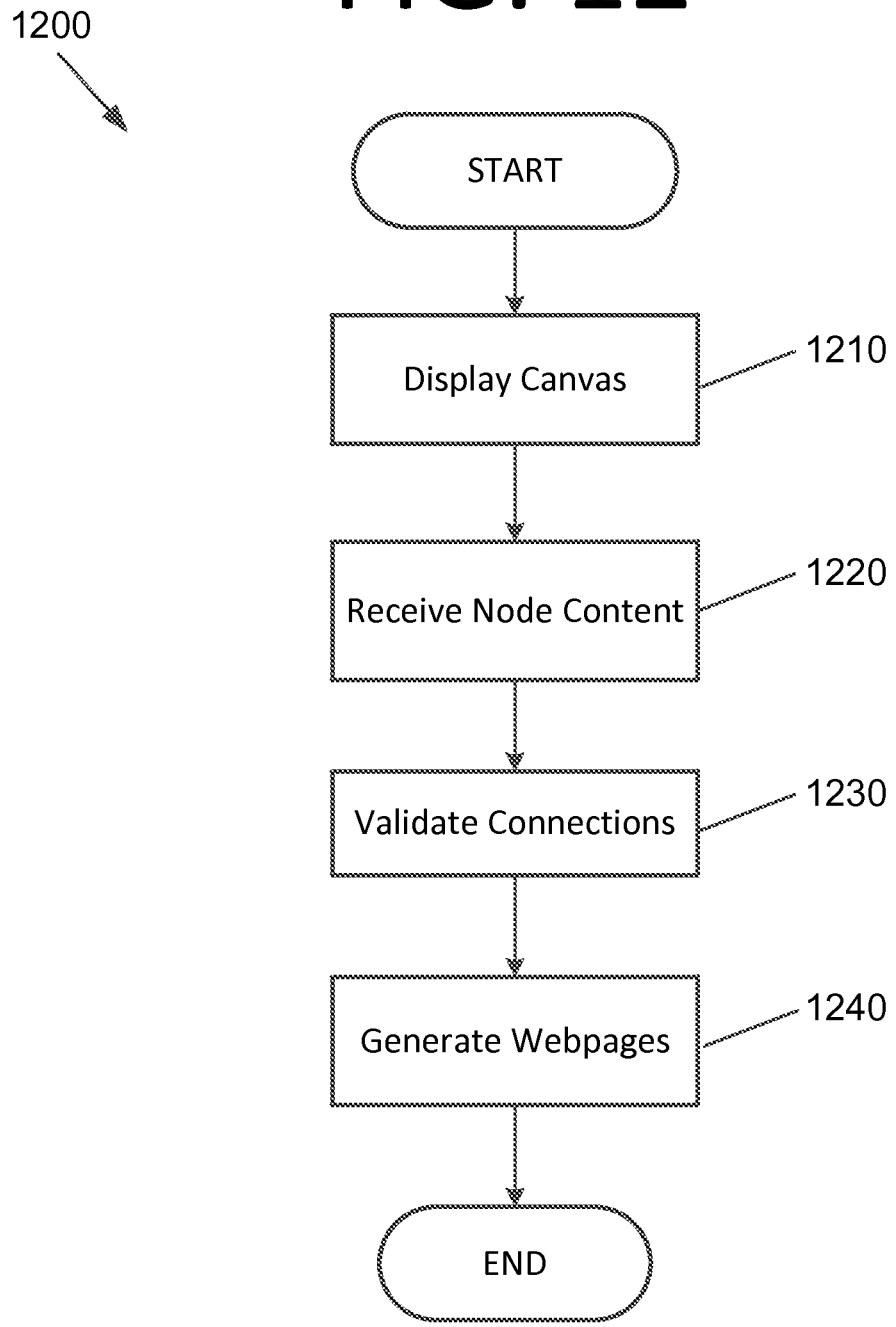
FIG. 12 is a flowchart illustrating yet another method for designing flowchart-based webpages, according to an embodiment of the present invention.

FIG. 12 is a flowchart 1200 illustrating yet another method for designing flowchart-based webpages, according to an embodiment of the present invention. In some embodiments, the method may be implemented, for example, by computing system 1300 of FIG. 13. The method begins with displaying a canvas at 1210 that can be used for placement of a plurality of nodes to be associated with respective webpages.

Content to include in the respective webpages for the nodes is received at 1220. Connections between the nodes are validated based on the node type at 1230. Each node type may have its own respective connection rules. When the validation succeeds, the webpages for the respective nodes are generated at 1240 based on the node content and the validated connections between the nodes.

Figure 13:
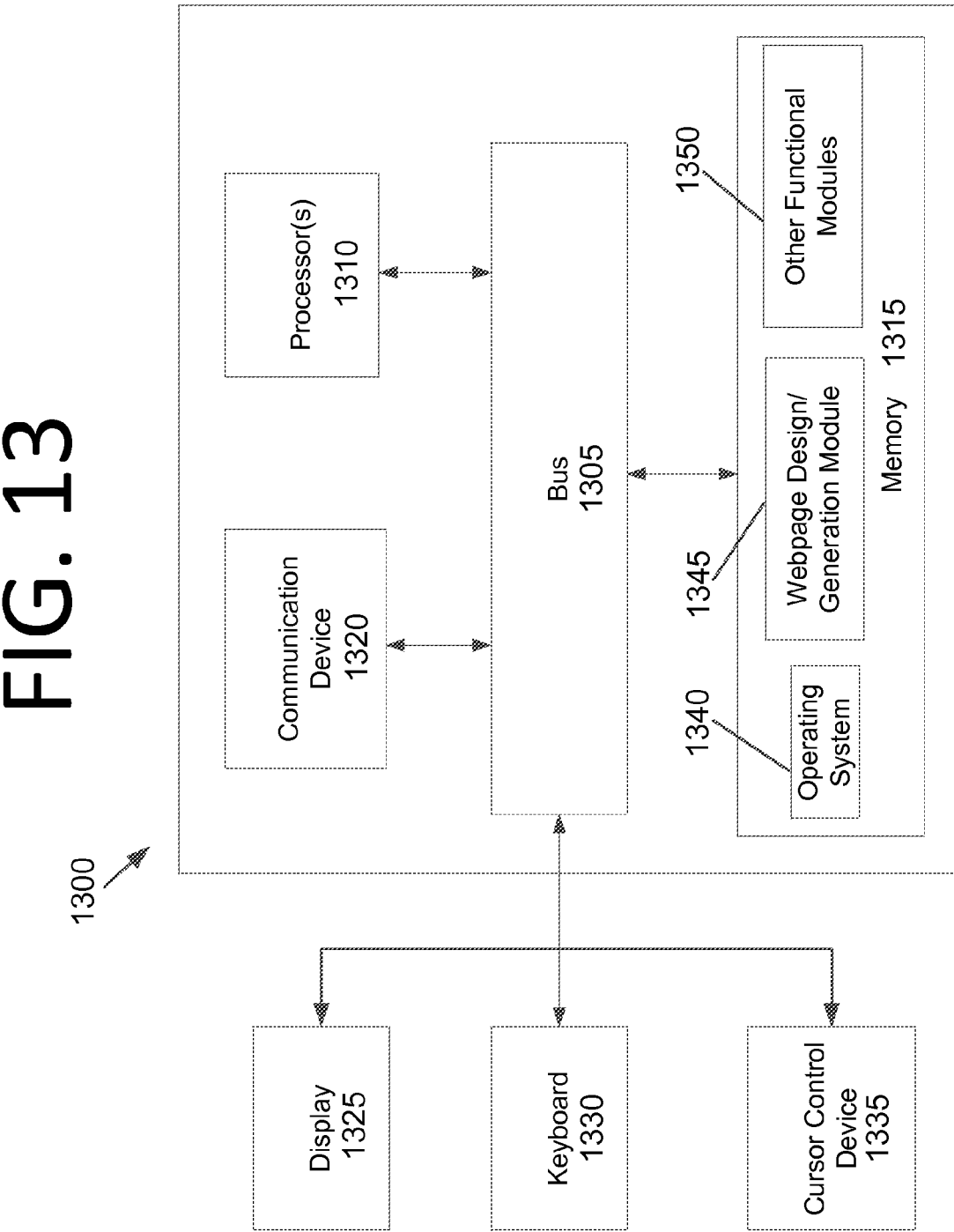
FIG. 13 illustrates a computing system for designing webpages using flowcharts, according to an embodiment of the present invention.

FIG. 13 illustrates a computing system 1300 configured to assist with designing and generating flowchart-based webpages, according to an embodiment of the present invention. System 1300 includes a bus 1305 or other communication mechanism for communicating information, and processor(s) 1310 coupled to bus 1305 for processing information. Processor(s) 1310 may be any type of general or specific purpose processor, including a central processing unit ("CPU") or application specific integrated circuit ("ASIC"). Processor(s) 1310 may also have multiple processing cores, and at least some of the cores may be configured for specific functions. System 1300 further includes a memory 1315 for storing information and instructions to be executed by processor(s) 1310. Memory 1315 can be comprised of any combination of random access memory ("RAM"), read only memory ("ROM"), flash memory, cache, static storage such as a magnetic or optical disk, or any other types of non-transitory computer-readable media or combinations thereof. Additionally, system 1300 includes a communication device 1320, such as a transceiver, to wirelessly provide access to a communications network.

Non-transitory computer-readable media may be any available media that can be accessed by processor(s) 1310 and may include both volatile and non-volatile media, removable and non-removable media, and communication media. Communication media may include computer-readable instructions, data structures, program modules or other data in a modulated data signal such as a carrier wave or other transport mechanism and includes any information delivery media.

Processor(s) 1310 are further coupled via bus 1305 to a display 1325, such as a Liquid Crystal Display ("LCD"), for displaying information to a user. A keyboard 1330 and a cursor control device 1335, such as a computer mouse, are further coupled to bus 1305 to enable a user to interface with system 1300. However, in certain embodiments such as those for mobile computing implementations, a physical keyboard and mouse may not be present, and the user may interact with the device solely through display 1325 and/or a touchpad (not shown). Any type and combination of input devices may be used as a matter of design choice.

In one embodiment, memory 1315 stores software modules that provide functionality when executed by processor(s) 1310. The modules include an operating system 1340 for system 1300. The modules further include a webpage design/generation module 1345 that is configured to assist a designer with designing and generating flowchart-based webpages.

System 1300 may include one or more additional functional modules 1350 that include additional functionality.

One skilled in the art will appreciate that a "system" could be embodied as a personal computer, a server, a console, a personal digital assistant ("PDA"), a cell phone, a tablet computing device, or any other suitable computing device, or combination of devices. Presenting the above-described functions as being performed by a "system" is not intended to limit the scope of the present invention in any way, but is intended to provide one example of many embodiments of the present invention. Indeed, methods, systems and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, RAM, tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The method steps performed in FIGS. 10-12 may be performed by a computer program, encoding instructions for the nonlinear adaptive processor to perform at least the methods described in FIGS. 10-12, in accordance with embodiments of the present invention. The computer program may be embodied on a non-transitory computer-readable medium. The computer-readable medium may be, but is not limited to, a hard disk drive, a flash device, a random access memory, a tape, or any other such medium used to store data. The computer program may include encoded instructions for controlling the nonlinear adaptive processor to implement the methods described in FIGS. 10-12, which may also be stored on the computer-readable medium.

The computer program can be implemented in hardware, software, or a hybrid implementation. The computer program can be composed of modules that are in operative communication with one another, and which are designed to pass information or instructions to display. The computer program can be configured to operate on a general purpose computer, or an ASIC.

It will be readily understood that the components of various embodiments of the present invention, as generally described and illustrated in the figures herein, may be arranged and designed in a wide variety of different configurations. Thus, the detailed description of the embodiments of the systems, apparatuses, methods, and computer programs of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A non-transitory computer-readable storage medium storing a computer program, the computer program configured to cause at least one processor to:

display, on a display device, a canvas and a plurality of selectable nodes that a designer can select and place in desired positions on the canvas, each node associated with a respective webpage;

when the designer chooses to edit a node, display, on the display device, a node design screen allowing the designer to add content to the respective webpage associated with the node, the node design screen customized for a type of the node selected by the designer;

receive content to include in the respective webpage for each node and connections between the nodes from the designer;

validate the connections between the nodes based on the node type, each node type having its own respective connection rules; and when the validation succeeds, generate the webpages for the respective nodes based on the node content and the connections between the nodes, wherein the nodes and connections collectively form a flowchart on the canvas, and manual programming by the designer is not required to design the flowchart and generate the webpages.

2. The non-transitory computer-readable storage medium of claim 1, wherein the node types comprise a start node, a decision node, a selection node, an action node, and an end node, each having its own connection rules.

3. The non-transitory computer-readable storage medium of claim 2, wherein the program is further configured to cause the at least one processor to:

validate that start nodes have no inputs and one output;

validate that action nodes have at least one input and one output;

validate that decision nodes have at least one input and two outputs, wherein one output is true and the other output is false;

validate that selection nodes have at least one input and one output per selection; and validate that end nodes have at least one input and no outputs.

4. The non-transitory computer-readable storage medium of claim 1, wherein a start node is automatically created when the designer opens a new flowchart project.

5. The non-transitory computer-readable storage medium of claim 1, wherein the program is further configured to cause the at least one processor to:

display, on a display device, a custom node design screen comprising components that the designer can include in a custom node and connection rules for incoming and outgoing connections from the custom node;

receive, from the designer, the components and connection rules for the custom node; and generating the custom node based on the received components and connection rules, wherein once generated, the custom node is available for subsequent use in designing flowcharts.

6. The non-transitory computer-readable storage medium of claim 1, wherein the program is further configured to cause the at least one processor to:

automatically form connections between two nodes when the nodes are within a predetermined proximity of one another on the canvas.

7. The non-transitory computer-readable storage medium of claim 1, wherein each node is associated with a respective node identifier ("ID") that uniquely identifies the node in the flowchart.

8. A computer-implemented method, comprising:

displaying, by a computing system, a canvas and a plurality of nodes, each node associated with a respective webpage;

displaying, by the computing system, a node design screen allowing the designer to add content to the respective webpage associated with the node, the node design screen customized for a type of the node selected by the designer;

receiving, by the computing system, content to include in the respective webpage for each node from the designer;

automatically generating, by the computing system, connections between the nodes based on the types of the nodes and the content received from the designer;

validating, by the computing system, the connections between the nodes based on the types of the nodes, each node type having its own respective connection rules; and when the validation succeeds, generating, by the computing system, the webpages for the respective nodes based on the node content and the connections between the nodes.

9. The computer-implemented method of claim 8, wherein the node types comprise a start node, a decision node, a selection node, an action node, and an end node, each having its own connection rules.

10. The computer-implemented method of claim 9, further comprising:

validating, by the computing system, that start nodes have no inputs and one output;

validating, by the computing system, that action nodes have at least one input and one output;

validating, by the computing system, that decision nodes have at least one input and two outputs, wherein one output is true and the other output is false;

validating, by the computing system, that selection nodes have at least one input and one output per selection; and validating, by the computing system, that end nodes have at least one input and no outputs.

11. The computer-implemented method of claim 8, wherein a start node is automatically created when the designer opens a new flowchart project.

12. The computer-implemented method of claim 8, further comprising:

displaying, by the computing system, a custom node design screen comprising components that the designer can include in a custom node and connection rules for incoming and outgoing connections from the custom node;

receiving from the designer, by the computing system, the components and connection rules for the custom node; and generating the custom node based on the received components and connection rules, wherein once generated, the custom node is available for subsequent use in designing flowcharts.

13. The computer-implemented method of claim 8, further comprising:

automatically forming connections between two nodes when the nodes are within a predetermined proximity of one another on the canvas.

14. The computer-implemented method of claim 8, wherein each node is associated with a respective node identifier ("ID") that uniquely identifies the node in the flowchart.

15. An apparatus, comprising:

a display device;

physical memory comprising computer program instructions; and at least one processor configured to execute the computer program instructions, the at least one processor configured to:

display, on the display device, a canvas that can be used for placement of a plurality of nodes to be associated with respective webpages, receive content to include in the respective webpages for the nodes, validate connections between the nodes based on node type, each node type having its own respective connection rules, and when the validation succeeds, generate the webpages for the respective nodes based on the node content and the validated connections between the nodes.

16. The apparatus of claim 15, the at least one processor further configured to:

display, on the display device, a node design screen allowing a designer to add content to a respective webpage associated with the node, the node design screen customized for a type of the node.

17. The apparatus of claim 15, the at least one processor further configured to:

validate that start nodes have no inputs and one output;

validate that action nodes have at least one input and one output;

validate that decision nodes have at least one input and two outputs, wherein one output is true and the other output is false;

validate that selection nodes have at least one input and one output per selection; and validate that end nodes have at least one input and no outputs.

18. The apparatus of claim 15, wherein the at least one processor is further configured to:

automatically generating, by the computing system, connections between the nodes based on the types of the nodes and the content of each node.

19. The apparatus of claim 15, wherein the at least one processor is further configured to:

display, on a display device, a custom node design screen comprising components that can be included in a custom node and connection rules for incoming and outgoing connections from the custom node;

receive the components and connection rules for the custom node; and generate the custom node based on the received components and connection rules.

20. The apparatus of claim 15, wherein the at least one processor is further configured to:

automatically form connections between two nodes when the nodes are within a predetermined proximity of one another on the canvas.

* * * * *